(12) United States Patent
Tajbakhsh et al.

(10) Patent No.: US 9,686,448 B2
(45) Date of Patent: Jun. 20, 2017

(54) ADAPTIVE BLACK-LEVEL RESTORATION

(71) Applicant: Apple Inc., Cupertino, CA (US)

(72) Inventors: Touraj Tajbakhsh, Santa Clara, CA (US); Kostadin N. Dabov, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/836,586

(22) Filed: Aug. 26, 2015

(65) Prior Publication Data

US 2016/0373618 A1   Dec. 22, 2016

Related U.S. Application Data

(60) Provisional application No. 62/183,036, filed on Jun. 22, 2015.

(51) Int. Cl.
*H04N 9/64* (2006.01)
*H04N 5/16* (2006.01)
*H04N 9/71* (2006.01)
*H04N 5/361* (2011.01)

(52) U.S. Cl.
CPC ............. *H04N 5/165* (2013.01); *H04N 5/361* (2013.01); *H04N 9/646* (2013.01); *H04N 9/71* (2013.01)

(58) Field of Classification Search
None
See application file for complete search history.

(56) References Cited

U.S. PATENT DOCUMENTS

| | | | |
|---|---|---|---|
| 7,911,505 B2 | 3/2011 | Pillman | |
| 8,872,946 B2 | 10/2014 | Cote | |
| 2003/0222991 A1 | 12/2003 | Muammar | |
| 2014/0313375 A1 | 10/2014 | Mlinar | |
| 2015/0161814 A1 | 6/2015 | Engh-Halstvedt | |

*Primary Examiner* — Stephen Coleman
(74) *Attorney, Agent, or Firm* — Blank Rome LLP

(57) ABSTRACT

Methods and systems to improve the operation of graphic's system are described. In general, techniques are disclosed for compensating for an image sensor's non-zero black-level output. More particularly, a image sensor noise model may be used to offset an image's signal prior to clipping so that the image's dark signal exhibits a linear or near linear mean characteristic after clipping. In one implementation the noise model may be based on calibration or characterization of the image sensor prior to image capture. In another implementation the noise model may be based on an evaluation of the image itself during image capture operations. In yet another implementation the noise model may be based on analysis of an image post-capture (e.g., hours, days, . . . after initial image capture).

20 Claims, 8 Drawing Sheets

ADAPTIVE BLACK-LEVEL RESTORATION

BACKGROUND

This disclosure relates generally to the field of image processing. More particularly, but not by way of limitation, this disclosure relates to a technique for addressing the issue of residual noise (in the form of a black-level offset) in an image capture system.

Many electronic devices include image capture units. Common to these units is the use of a light-capturing sensor that can generate frames of raw image data (e.g., CMOS or CCD). These frames are processed before being stored in memory and/or displayed. For efficiency, many of these electronic devices process raw image data through a dedicated image processing pipeline, referred to herein as an image signal processor (ISP). Capturing images in low-light conditions presents a number of challenges for such systems for, despite advancements in noise reduction, the image signal output from a sensor will contain residual noise; noise that will be amplified as the image signal passes through the ISP.

SUMMARY

In one embodiment the disclosed concepts provide a method to restore, or compensate for, an image capture device's dark-level noise. The method includes obtaining an initial color image of a scene (the color image represented by a plurality of pixels at least some of which have negative values) and determining the initial image's pedestal value. As used here an image's pedestal value corresponds to, or is indicative of, an image capture device's dark-level noise statistic. In one embodiment this statistic or statistical measure may be indicative of the mean or median of an image capture device's sensor's output in a completely (or nearly completely) dark environment. Once determined, the pedestal value may be removed from the initial image resulting in a first-modified color image. This may in turn be clipped so that no pixel has a value less than specified value (e.g., value 'a'). A black-level offset value may then be determined from the first-modified color image and its clipped counterpart. The offset value may then be applied to the initial color image. In one embodiment the offset value may be applied to the initial color image prior to one or more image processing operations (e.g., de-noise, lens shading correction, white balance gain, demosaic, and color correction matrix operations). In another embodiment one or more image processing operations may be applied to the initial color image prior to restoration or compensation of an image capture device's dark-level noise in accordance with this disclosure. In some embodiments, black-level restoration as described herein may be based on quantization of the initial image. That is, black-level restoration may be based on a tiled representation of the initial image. As used here a "tile" represents a unique or non-overlapping region of the initial image, wherein the pixels within each region are combined in some fashion and, thereafter, treated as a single element. Methods in accordance with this disclosure may be retained or stored in a non-transitory storage device—in the form of computer or processor executable instructions—and thereafter incorporated into a stand-alone or embedded image capture device.

DETAILED DESCRIPTION

This disclosure pertains to systems, methods, and computer readable media to improve the operation of graphics systems. In general, techniques are disclosed for compensating for an image sensor's non-zero black-level output. More particularly, a restoration method using an image sensor noise model may be used to offset an image's signal so that the image's dark signal exhibits a linear or near linear mean characteristic after clipping. In one embodiment the noise model may be based on calibration or characterization of the image sensor prior to image capture. In another embodiment the noise model may be based on an evaluation of the image itself during image capture operations. In yet another embodiment the noise model may be based on analysis of an image post-capture (e.g., hours, days, . . . after initial image capture).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of image processing systems having the benefit of this disclosure.

Figure 1:
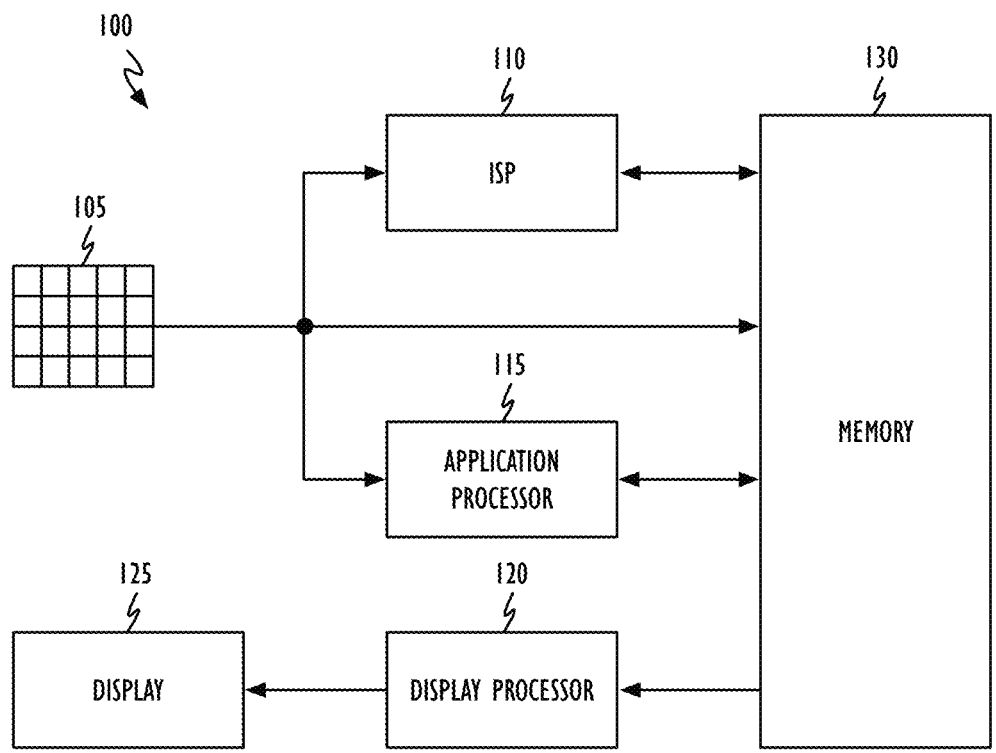
FIG. 1 shows, in block diagram form, an image capture system in accordance with one embodiment.

Referring to FIG. 1, in one embodiment digital image capture system 100 includes image sensor 105, image signal processor (ISP) 110, application processor 115, display processor 120, display 125, and memory 130. Image sensor 105 could be, for example, a CMOS or CCD image sensor. In one embodiment ISP 110 may be a special purpose processor such as a graphics processing unit or a programmable graphics processing unit (GPU). In another embodiment ISP 110 may be an application-specific integrated circuit (ASIC). In yet another embodiment, ISP 110 may be a combination of special purpose and general purpose processing elements. In still another embodiment ISP 110 may include or implement an image processing pipeline (see below). Application processor 115 may also be a general purpose processor (e.g., using a multi-core complex instruction set based architecture) or a special purpose processor (e.g., using a reduced instruction set based architecture). Display processor 120 may be as simple as a shift-register (e.g., a frame buffer), or as complex as a custom designed graphics engine. Display 125 may be small or large and may use, for example, liquid crystal display or light emitting diode technology. Memory 130 may include random access memory (RAM) including cache memory. Memory 130 may also include static or long-term storage elements.

Figure 2:
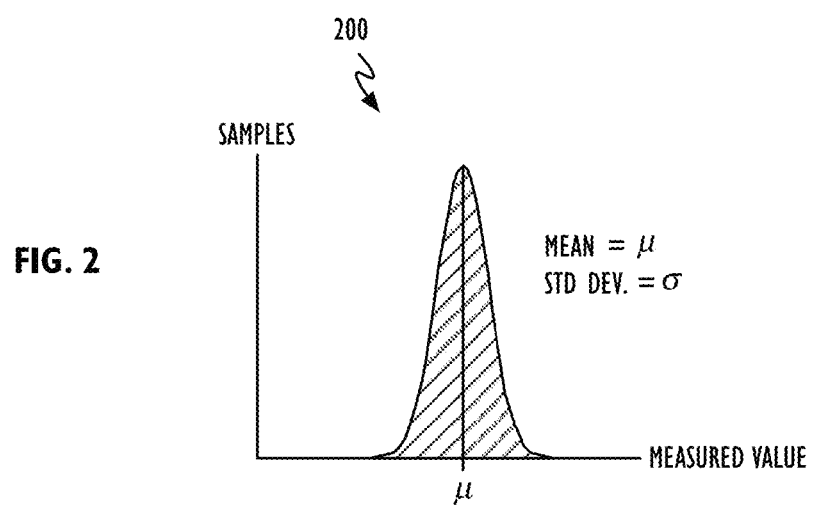
FIG. 2 shows black-level output from a typical image sensor.

It is generally accepted that typical sensor noise (e.g., from sensor 105) can be modeled as signal dependent Gaussian noise with a linear signal to variance relationship:

$$\sigma^2(s) = \beta s + \eta_0, \qquad \text{EQ. 3}$$

where 's' represents the noise free signal from sensor 105, $\sigma^2$ represents the variance of the noisy signal ŝ from sensor 105, and $\eta_0$ and $\beta$ are linear model parameters. Referring to FIG. 2, output 200 from illustrative sensor 105 in complete, or nearly complete, darkness may generate a noise floor around positive pedestal value $\mu$ and have a standard deviation of $\sigma$. That is, over a large number of trials in a dark environment, output from sensor 105 generates distribution 200 having mean $\mu$ and standard deviation $\sigma$.

Figure 3:
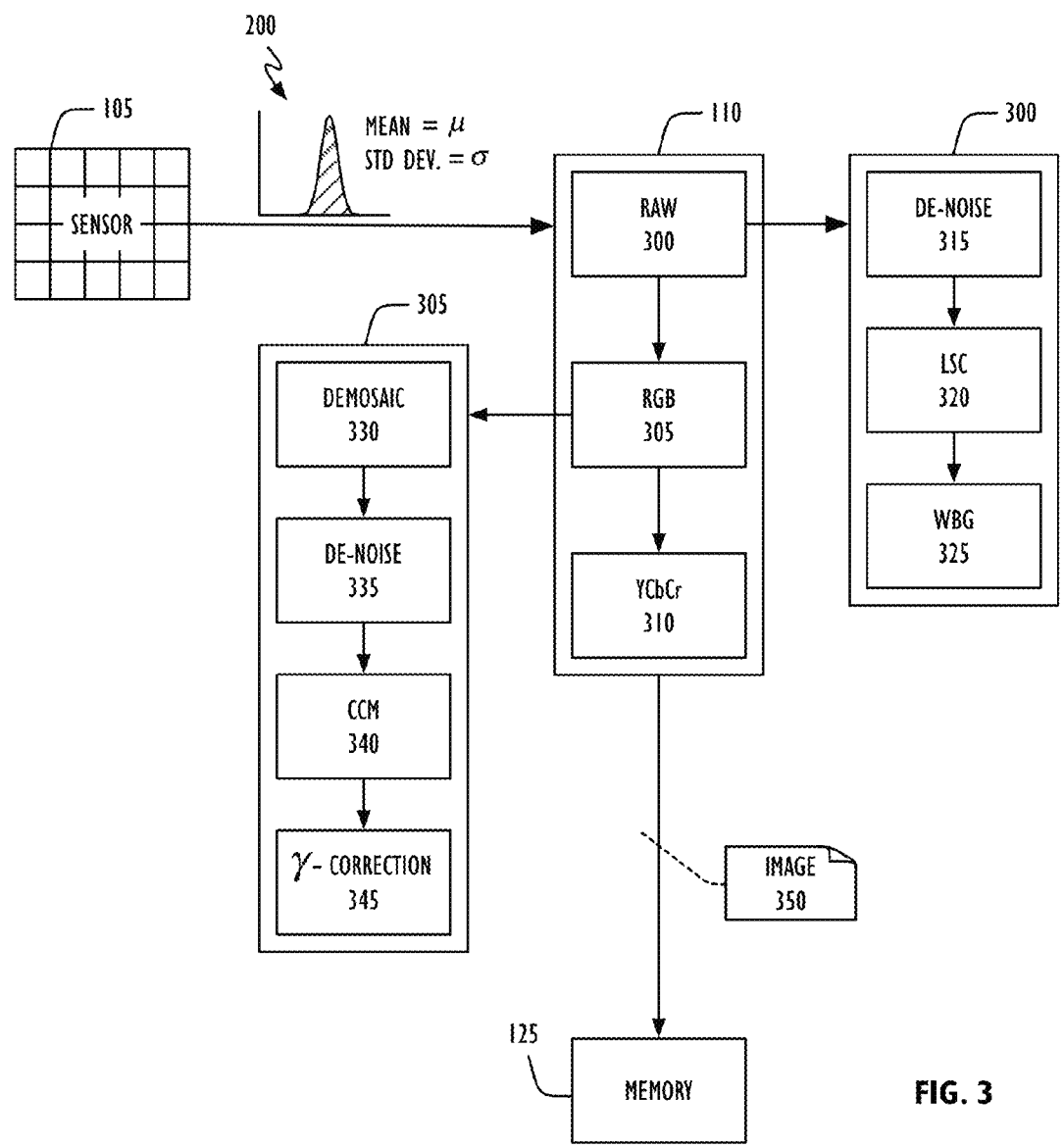
FIG. 3 shows, in block diagram form, an image signal processor in accordance with one embodiment.

Referring to FIG. 3, ISP 110 may include raw processing module 300, RGB processing module 305 and YCbCr processing module 310. In turn, RAW processing module 300 may include de-noise module 315, lens shading correction (LSC) module 320, and white balance gain (WBG) module 325. Similarly, RGB processing module 305 may include demosaic module 330, de-noise module 335, color correction matrix (CCM) module 340, and gamma-correction module 345. In illustrative digital image capture system 100, RAW processing module 300 and RGB processing module 305 may each include one or more gain stages. By way of example, LSC module 320 may apply spatially-variant gains to the image to correct for vignetting (e.g., light fall-off) and color shading; WBG module 325 may apply gains globally or locally and on a channel-by-channel basis either of which generally depend on scene illumination and are typically determined by the digital image capture device's automatic white balancing system; and demosaic module 330, CCM module 340, and gamma-correction module 345 may also introduce gain to one or more channels. Further, de-noising modules 315 and 335 may be used to reduce the amount of signal degrading noise as an image (an image's signal) passes through ISP 110 (de-noising can also reduce the variance of the noise floor). It should be noted that while 2 de-noising modules have been shown in FIG. 3 (modules 315 and 335), one, both, neither or more de-noising modules may be present in any given implementation.

At some point as an image's signal passes through ISP 110, the negative values used to represent the image must be clipped to zero to make possible the image's output into a standard format such as, for example, JPEG (e.g., image 350). This clipping may cause an undesired artifact expressed as an elevated and tinted black region in the final image and referred to herein as "purple-black" (e.g., in image 350). When a noisy image signal ŝ becomes clipped (clipped signal=s̄=max(a,ŝ)), the mean of the clipped noise distribution becomes biased.

Figure 4A:
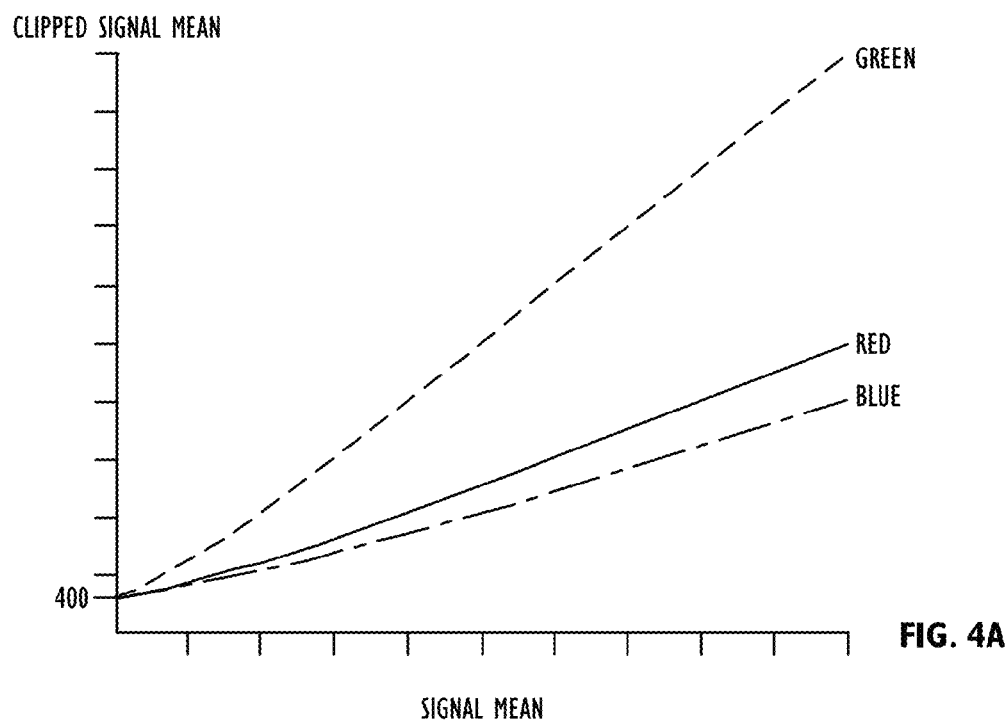
FIGS. 4A and 4B illustrate color channel offsets before and after application of white balance gain in accordance with one embodiment.

Referring to FIG. 4A, in complete or nearly complete darkness the mean of the RGB channels prior to clipping may be zero (up to the point of clipping, positive and negative values may be used to represent the image). After the positive pedestal value or mean of the noisy signal is removed and the image is "clipped," the signal mean may no longer be zero but a positive number 400. The new mean 400 depends on the noise variance $\sigma^2(s)$ and the clip value 'a' of the distribution. (In many signal processing operations performed by ISP 110, 'a' may be 0.)

Figure 4B:
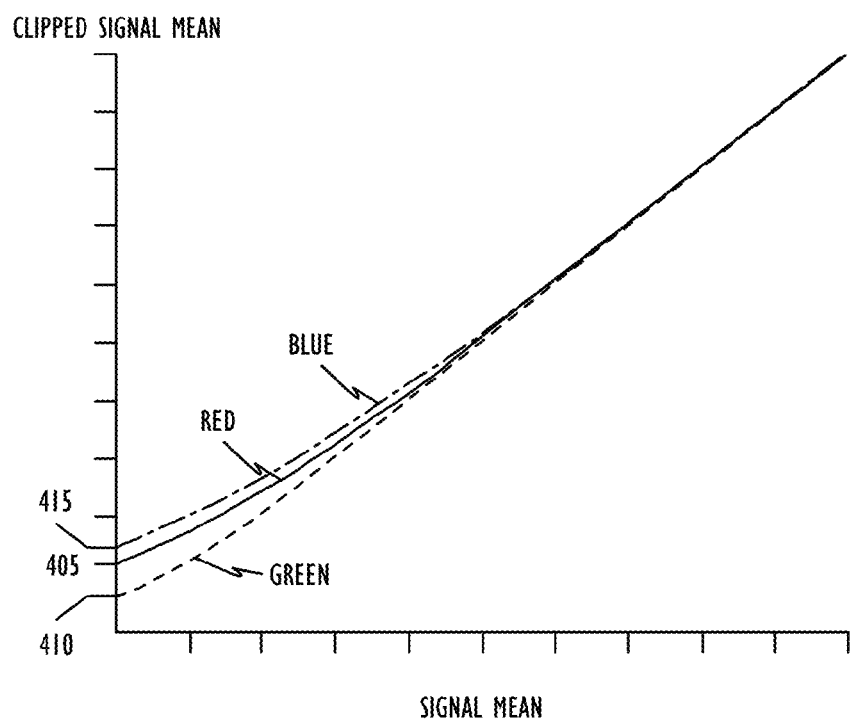

Purple-black may be caused when white balance gain (WBG) is applied to the clipped signal such that the mean for each of the color channels becomes unequal. Referring to FIG. 4B, if a WBG of [A, B, C] is applied to the biased black channel values illustrated in FIG. 4A, the individual channel biases may be amplified (the red channel by a factor or A, the green channel by a factor of B, and the blue channel by a factor of C) such that that G (410)<R (405)<B (415): this can result in a purple/magenta cast to black regions of an image. A similar effect may occur when G<B<R, but where R is approximately equal to B. Purple/magenta is just one instance of the artifact. Based on WBG gains, any permutation of the inequality may arise, but the most typical ones are G<R<B and G<B<R.

The mean of a truncated normal distribution may be determined analytically. Suppose $X \sim N(\mu, \sigma^2)$ has a normal distribution:

$$\phi_{\mu,\sigma}(x) = \frac{1}{\sigma\sqrt{2\pi}} \exp\left(-\frac{(x-\mu)^2}{2\sigma^2}\right), \qquad \text{EQ. 2}$$

then the expectation value of a one-sided truncation may be given as:

$$E(X \mid X > a) = \mu + \frac{\sigma \phi_{0,1}(\alpha)}{1 - \Phi(\alpha)}, \qquad \text{EQ. 3}$$

where $\phi_{0,1}$ is the standard normal distribution, $\Phi(\bullet)$ is the normal cumulative distribution function:

$$\Phi(\xi) = \frac{1}{\sqrt{2\pi}} \int_{-\infty}^{\xi} e^{-x^2/2} dx, \qquad \text{EQ. 4}$$

and $\alpha = (a-\mu)/\sigma$ where 'a' is the truncation value. The expectation value of a normal distribution clipped at 'a' is similar to the mean of the truncated distribution except that the distribution below a is accumulated at a, i.e., $X_a = \max(a, X)$ so that:

$$E(X_a) = E(X \mid X > a)[1 - \Phi(\alpha)] + a\Phi(\alpha) \qquad \text{EQ. 5}$$

If the clip level is defined as a=0, the expectation value of $X_a$ may be expressed as:

$$E(X_0) = \int_0^\infty x\phi_{\mu,\sigma}(x)\,dx. \qquad \text{EQ. 6}$$

In order to restore the elevated black as illustrated in FIG. 4B, the mean of the noise distribution needs to be lowered prior to clipping. For pure black, i.e., an image captured in darkness, the majority of the distribution needs to be brought below the clip level such that the mean after clipping is near zero. The higher the intensity of the signal mean, the less it is required to lower the distribution's mean since clipping will effect the noise distribution less. It is significant to note that simply removing (i.e., subtracting) the mean noise value $\mu$ from the pre-clipped image signal does not restore the mean value of the clipped signal to zero.

Figure 5A:
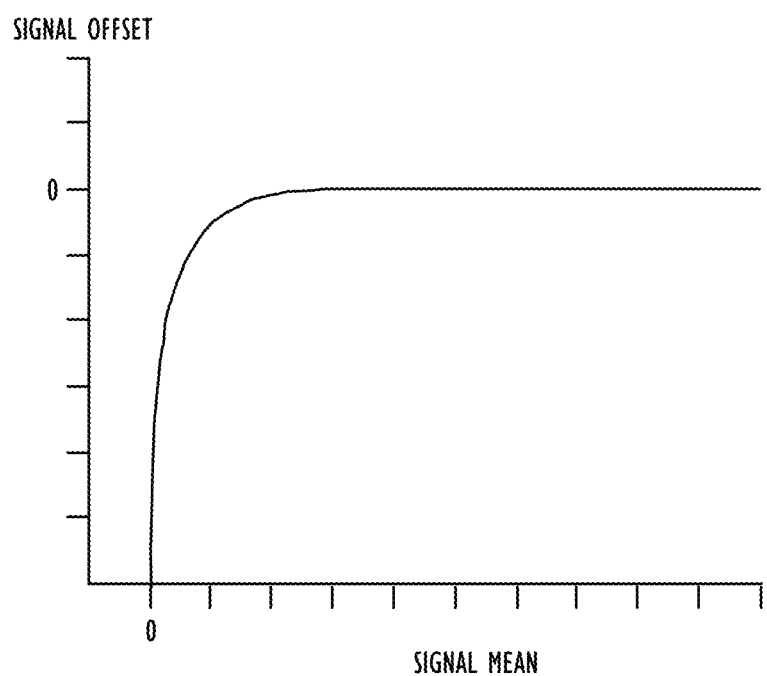
FIGS. 5A and 5B illustrate color channel offset and resulting signal mean behavior in accordance with one embodiment.
Figure 5B:
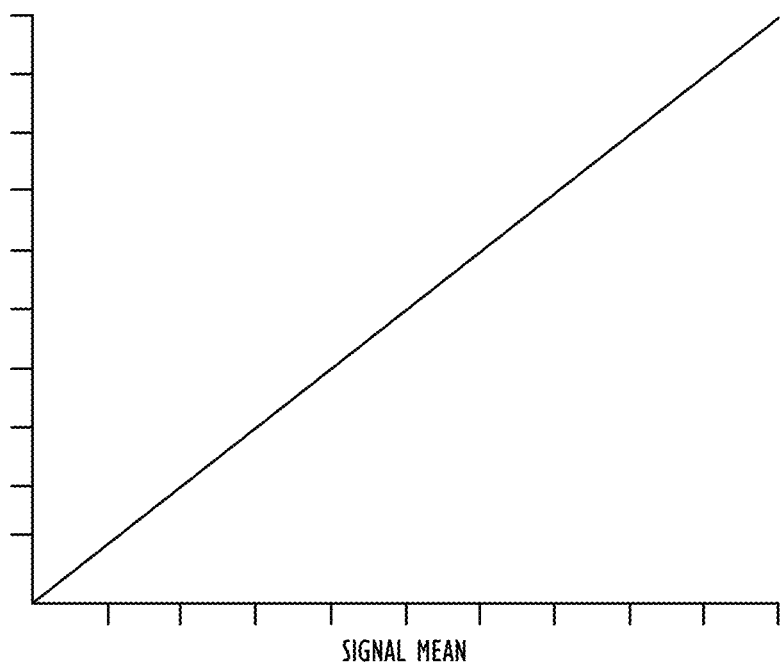

Referring to FIG. 5A, the offset required to adjust the green channel (see FIG. 4A) to obtain a near linear mean characteristic after clipping is shown (see FIG. 5B). In accordance with this disclosure, the iterative procedure described by Table 1 may be used to determine the offsets as illustrated in FIG. 5A.

TABLE 1

Determine Bias Correction Offsets

Data: Noise variance function $\sigma^2$ ($\mu$) and termination
threshold $\epsilon$
Result: Offsets $\beta(s)$
for $s \in$ signal range do
    $\delta := 0$; m $:= \mu$
    repeat
        $\delta := \delta + m - \mu$
        m = E(max(0, X − $\delta$)) -- see EQ. 6
    until (m − $\mu$ < $\epsilon$)
    $\beta(s) = -\delta$
end As used in Table 1: $\mu$ represents the mean of the pre-clipped signal; 'm' represents the calculated mean of the clipped signal at each step of the operation; and $\delta$ represents the offset that needs to be subtracted from the pre-clipped signal so that the mean of the pre-clipped signal ($\mu$) and clipped signal (m) are the same to within an amount specified by $\epsilon$ ($\epsilon$ determines the accuracy of the correction). The smaller $\epsilon$ is, the steeper the curve illustrated in FIG. 5A will become for small values of $\mu$. By way of example, for $\mu$=0 an infinitely large offset value would be needed to bring the post-clip signal to zero.

As noted earlier, the noise characteristics at the beginning of ISP 110 are generally independent of the color channel (e.g., see FIG. 4A) and, as a consequence, all three channels may be treated equally. After such operations however (e.g., after application of LSC or WBG), it may be necessary to account for these gains when applying channel offsets in accordance with this disclosure.

In order to correct the mean bias of a signal with the offsets presented above, statistics may be collected from the image. For this, an image may be divided into N×M tiles, over which the signal below a threshold 't' may be accumulated and divided by the number of pixels below the threshold t. Such a value may be taken to represent the sensor's black-level behavior for that tile's corresponding location/pixels. This value may be obtained for each RGB color channel separately, or for all color channels together. (The threshold 't' may be used to exclude high intensity pixels from the summation since these pixels do not contribute to the pixel clipping issue and only contaminate the mean of the dark pixel distribution.) The first approach results in three values for every tile (one each for the red, green, and blue channels). The second approach results in one value for every tile. Whether to apply the correction independently for each color channel or the same correction to all color channels may depend on whether channel dependent gains (e.g., WBG) were applied to the signal prior to determination and application of offsets in accordance with this disclosure.

Figure 6:
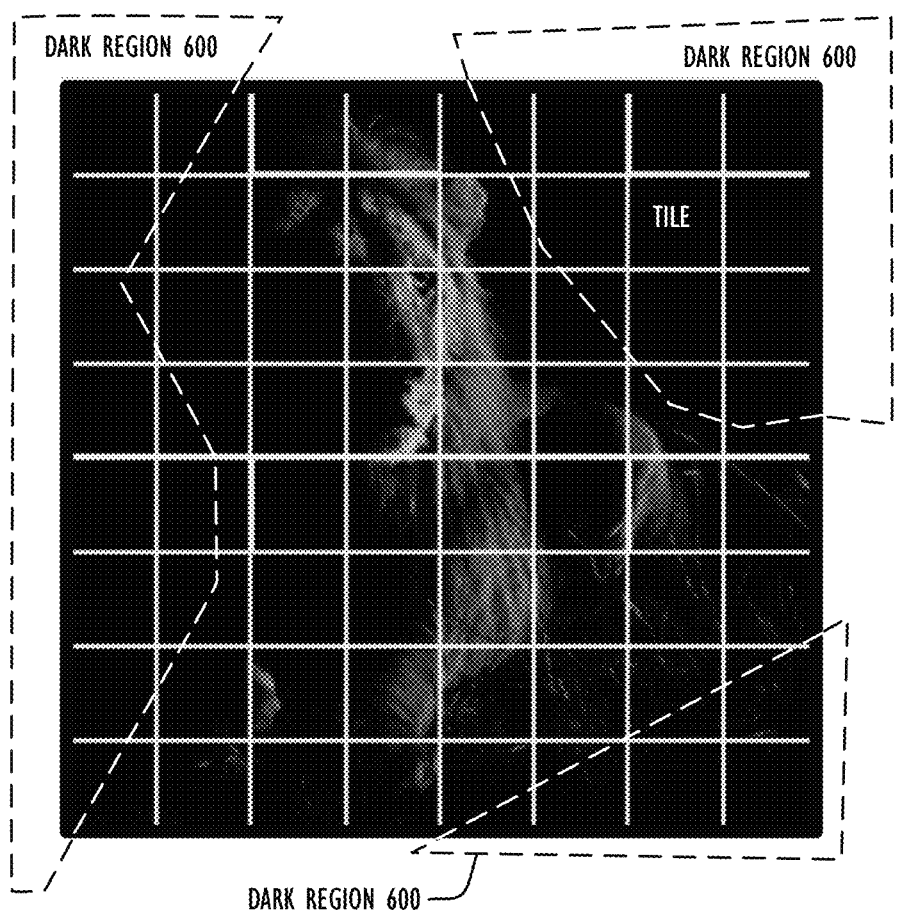
FIG. 6 illustrate image tiling in accordance with one embodiment.

Referring to FIG. 6 considering the dark areas of the image, the tile values may be taken to represent the mean of the low intensity noisy signal. That is, tile values of the unclipped signal represent an estimate of the signal mean $\mu$ (see FIG. 2). If the noise variance $\sigma^2(s)$ of the image signal is known from, for example, device calibration, the process described in Table 1 may be used immediately to determine the required channel offsets so as to lower the mean of each tile, so that a later clip operation results in a linear, or nearly linear, response of the signal mean (see FIG. 5B). For instance, the variance $\sigma^2(s)$ can be determined offline using sensor characterization and parameterized by an affine-linear model such as that represented by EQ. 1.

In the case an initial noise model is unavailable, or to the fact that signal clipping is carried out late in the ISP pipeline (after the signal has undergone one or more possibly non-linear operations rendering any initial noise model invalid), or if the correction proposed here is carried out after spatial-variant gains such as LSC gains, model parameters may be estimated from tile statistics. If the tile statistics calculation logic not only provides a sum of pixel values below a threshold 't', but also provides the sum of the same pixel's squared values, the variance can be calculated using:

$$Var(X)=E[X^2]-(E[X])^2. \qquad \text{EQ. 7}$$

If only the mean is available from the tile statistics calculation logic, the variance of the signal may alternatively be calculated using the mean of the unclipped signal and the mean of the clipped signal. More specifically, given the values of $E[X]$ and $E[max(0,X)]$, the variance $\sigma^2$ may be determined using EQ. 5 following the iterative procedure outlined below in Table 2.

TABLE 2

Determine Black-Level Noise Variance From Mean

Data: $\mu$ of X, mean $\mu_a$ of the clipped distribution $X_a$ and
termination threshold $\tau$
Result: variance $\sigma^2$
$\sigma_1 := \infty$; i := 0
repeat
    i := i + 1
    $\alpha := (\alpha - \mu)/\sigma_i$
    $\sigma_{i+1} := (\mu_a - \mu + [\mu - a]\Phi(\alpha))/\phi_{0,1}(\alpha)$
until $|\sigma_{i+1} - \sigma_i| < \tau$
    $\sigma^2 := \sigma_{i+1}^2$
end Because the variance determination is sensitive to a change in the image signal, the obtained variance may be bounded by a range of reasonable values. In one embodiment this range may be obtained empirically by experimentation. In another embodiment, if the number of pixels having a value less than 't' is too low, the variance and mean determination can be considered as not confident and as a replacement the average values of, for example, the neighboring tiles may be used instead.

Once the statistics are collected and a pair of local means and standard deviations has been obtained, local offsets for bias correction may be determined in accordance with the procedure given in Table 1. The offsets of each tile may be added locally to the pixels of the corresponding image areas. To avoid a sudden jump between tile boundaries (discontinuities), the offsets may be interpolated at tile-to-tile edges to obtain a smooth offset map (e.g., bi-linearly). In one embodiment this offset correction may be carried out separately for each color channel. In another embodiment, if the correction and clipping are performed before any channel dependent gain operations, the same offset may be applied to all color channels. In still another embodiment, if the offset is to be applied after the signal has passed through one or more gain stages, these gains must be accounted for prior to applying the offsets.

In some embodiments, an offset applied to an area represented by a tile can lead to other pixels being altered which are not part of the dark signal noise distribution, i.e., higher intensity pixels. In order to exclude these pixels from the offset operation, a non-linear transfer function may be applied to the pixels of each tile. This transfer function may clip those pixels which the offset is supposed to bring below the zero line while keeping higher intensity pixels unchanged. In between these two cases the transfer function may be transient. The transfer function of each tile may be applied locally to the pixels of the corresponding image areas. Again, to avoid a sudden jump between tile boundaries (discontinuities) the abutting tiles' transfer functions may be interpolated to obtain a smooth function map (e.g., bi-linearly).

Figure 7:
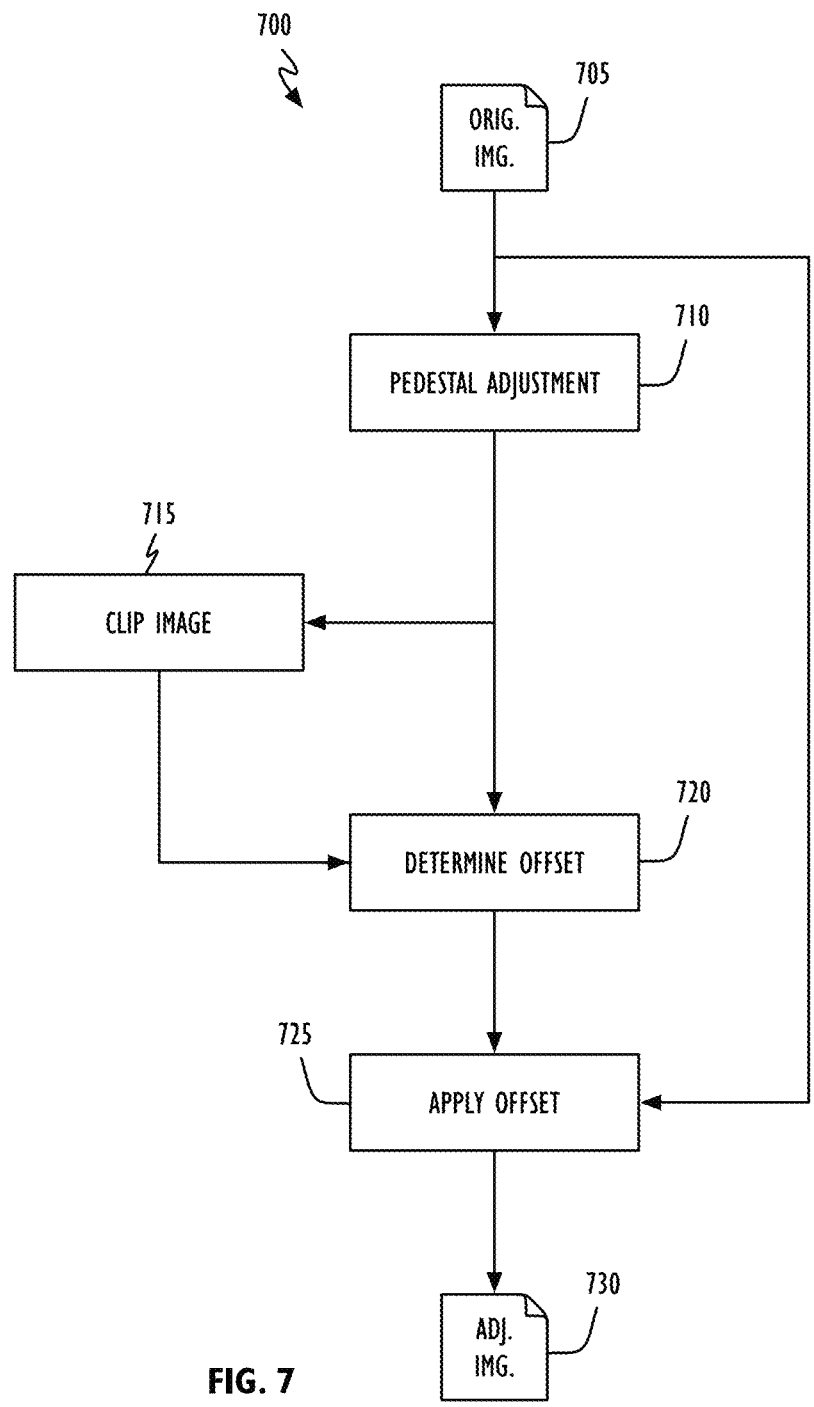
FIG. 7 shows, in flowchart form, a black-level restoration operation in accordance with one embodiment.

In summary and referring to FIG. 7, black-level restoration operation 700 in accordance with this disclosure first determines the pedestal value for original color image 705. In one embodiment, the pedestal value may be determined from image 705 (on an image-by-image basis). In another embodiment, the pedestal value may be pre-determined or pre-computed. The pedestal value may then be removed from image 705 (block 710), where after the pedestal adjusted image may be clipped such that no value in the clipped image is less a specified value (block 715). In one embodiment, both the pedestal adjusted image (output from block 710) and the clipped image (output of block 715) may be used to determine an offset value (block 720). In one embodiment, the offset value may be determined in accordance with Table 1 while in another embodiment the offset value may be determined in accordance with Table 2. The Offset value can be removed from input image 705 (block 725) to produce adjusted image 730. In one implementation, adjusted image 730 may undergo one or more image processing operations such as, for example, LSC and/or white balance gain. In other implementations, image processing operations such as those mentioned here may be applied to original image 705 or the pedestal adjusted image prior to determining an offset value and generation of adjusted image 730.

Figure 8:
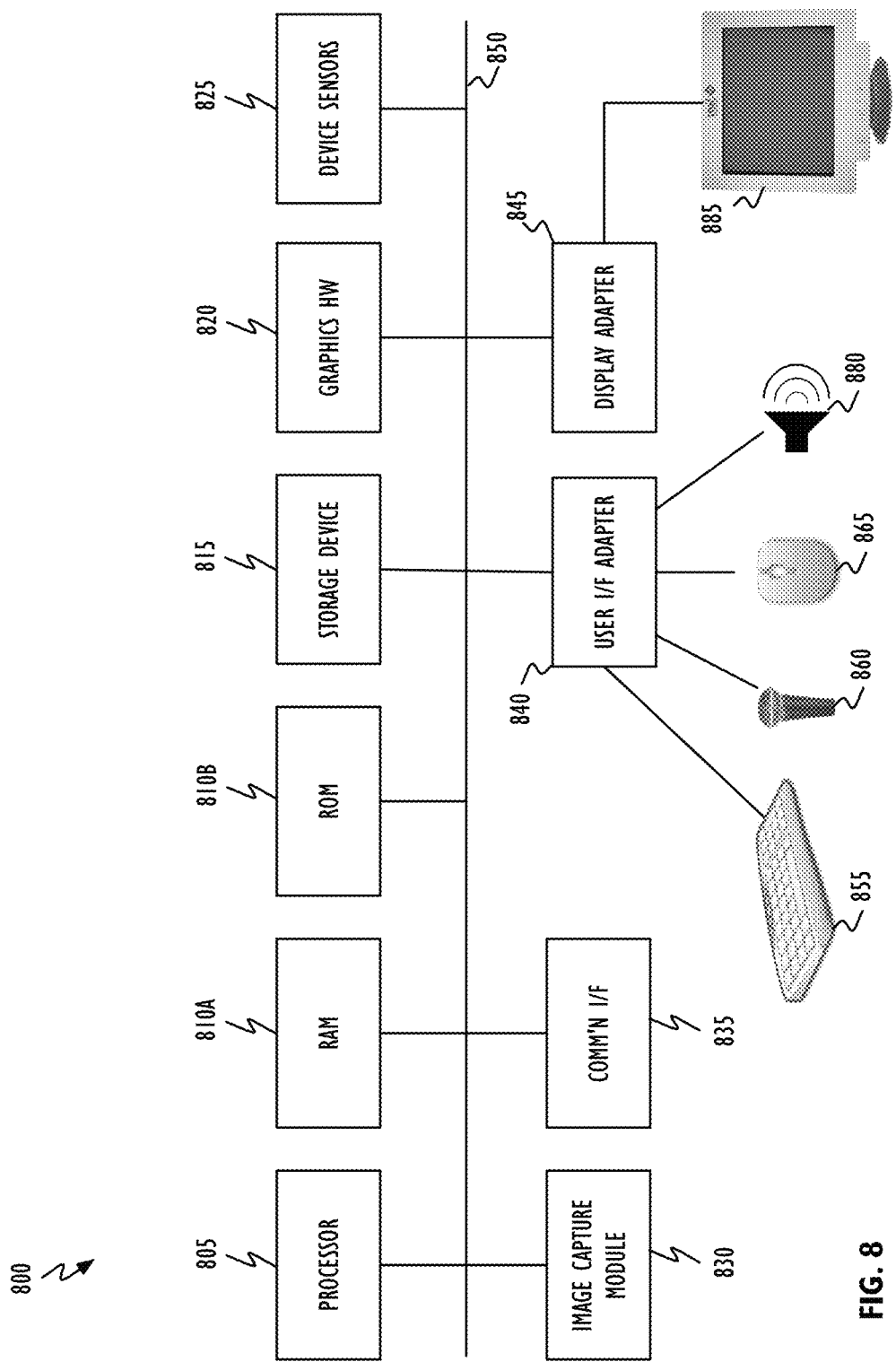
FIG. 8 shows, in block diagram form, a computer system in accordance with one embodiment.

Referring to FIG. 8, the disclosed adaptive black-level restoration operations in accordance with this disclosure may be performed by representative computer system 800 (e.g., a general purpose computer system such as a desktop, laptop, notebook or tablet computer system). Computer system 800 may include one or more processors 805, memory 810 (810A and 810B), one or more storage devices 815, graphics hardware 820, device sensors 825 (e.g., 3D depth sensor, proximity sensor, ambient light sensor, accelerometer and/or gyroscope), image capture module 830, communication interface 835, user interface adapter 840 and display adapter 845—all of which may be coupled via system bus or backplane 850 which may be comprised of one or more continuous (as shown) or discontinuous communication links. Memory 810 may include one or more different types of media (typically solid-state) used by processor 805 and graphics hardware 820. For example, memory 810 may include memory cache, read-only memory (ROM), and/or random access memory (RAM). Storage 815 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 810 and storage 815 may be used to retain media (e.g., audio, image and video files), preference information, device profile information, computer program instructions or code organized into one or more modules and written in any desired computer programming language, and any other suitable data. When executed by processor(s) 805 and/or graphics hardware 820 such computer program code may implement one or more of the methods described herein. Image capture module 830 may include one or more image sensors, one or more lens assemblies and any memory, mechanical actuators (e.g., to effect lens movement), and processing elements (e.g., ISP 110) used to capture images. Image capture module 830 may also provide information to processors 805 and/or graphics hardware 820. Communication interface 835 may be used to connect computer system 800 to one or more networks. Illustrative networks include, but are not limited to, a local network such as a USB network, an organization's local area network, and a wide area network such as the Internet. Communication interface 835 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 835 may be used to connect keyboard 850, microphone 855, pointer device 860, speaker 865 and other user interface devices such as a touch-pad and/or a touch screen and a separate image capture element (not shown). Display adapter 840 may be used to connect one or more display units 870 which may provide touch input capability. Processor 805 may be a system-on-chip such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable GPUs and each such unit may include one or more processing cores.

Figure 9:
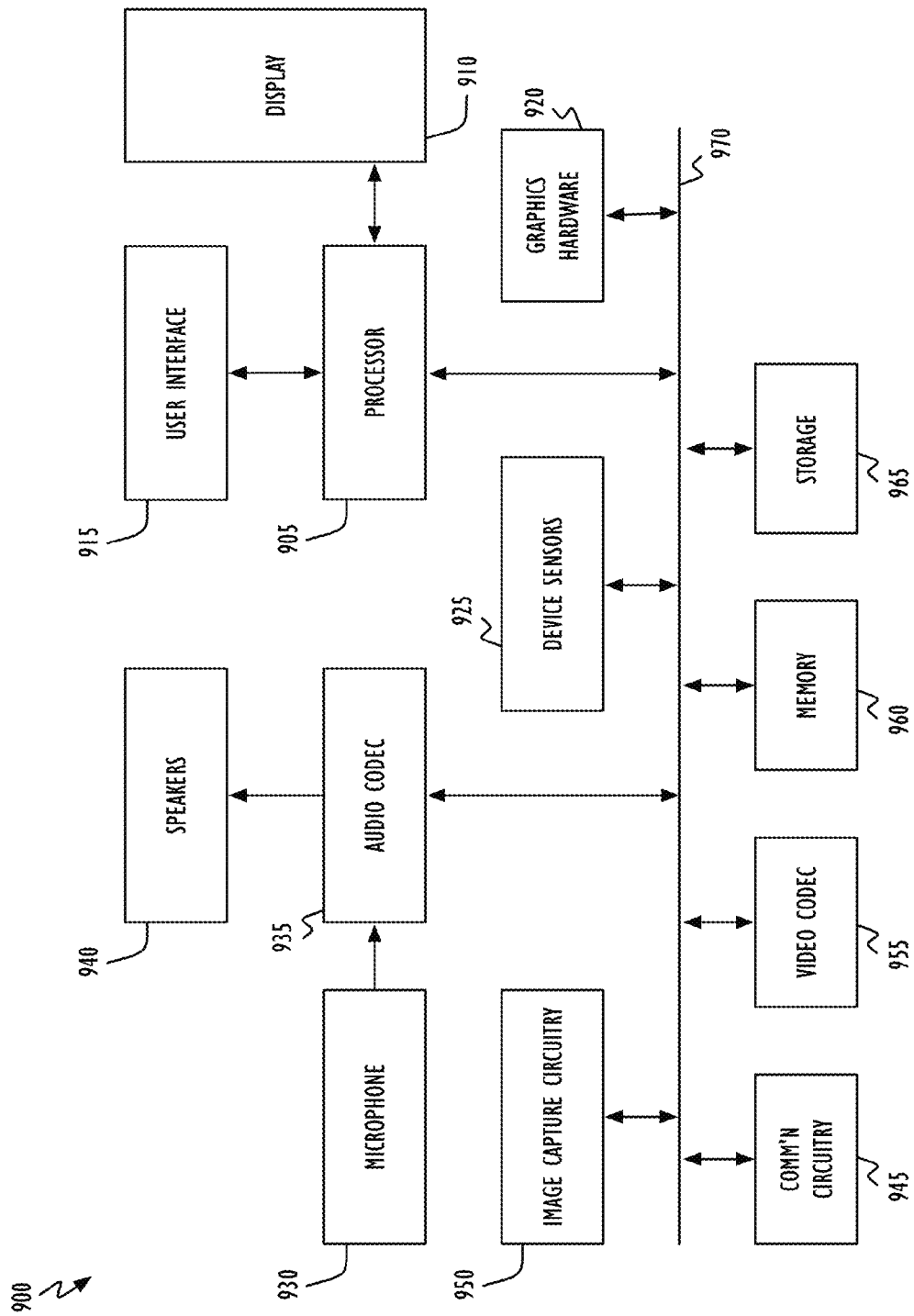
FIG. 9 shows, in block diagram form, a multi-function electronic device in accordance with one embodiment.

Referring to FIG. 9, a simplified functional block diagram of illustrative mobile electronic device 900 is shown according to one embodiment. Electronic device 900 could be, for example, a mobile telephone, personal media device, a notebook computer system, or a tablet computer system. As shown, electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, image capture circuit or unit 950, video codec(s) 955, memory 960, storage 965, and communications bus 970.

Processor 905, display 910, user interface 915, graphics hardware 920, device sensors 925, communications circuitry 945, memory 960 and storage 965 may be of the same or similar type and serve the same or similar function as the similarly named component described above with respect to FIG. 8. Audio signals obtained via microphone 930 may be, at least partially, processed by audio codec(s) 935. Data so captured may be stored in memory 960 and/or storage 965 and/or output through speakers 940. Image capture circuitry 950 may capture still and video images and provides the same structure and function as does image capture module 830. Output from image capture circuitry 950 may be processed, at least in part, by video codec(s) 955 and/or processor 905 and/or graphics hardware 920, and/or a dedicated image processing unit incorporated within circuitry 950. Images so captured may be stored in memory 960 and/or storage 965.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, an image capture device may use a pre-capture noise model at one time (applying, for example, the process given in Table 1), and a newly determined noise model at other times (applying, for example, the process given in Table 2). If the earlier and more current noise models do not agree, a system in accordance with this disclosure may continue to use the original model, the new model, or a combination of the two. For example, if the newly determined model is less than some specified amount different from a prior model, the prior model may retained. It will further be appreciated that certain described parameters (e.g., thresholds 't' and τ) may be set to aid in accomplishing the designer's operational goals and may be based, for example, on image sensor specifications and/or empirical data obtained from the device (e.g., device 100).

ISP 110 has been shown with certain functional blocks. Not all of these blocks may be present in any given implementation. In some embodiments, additional functional units may be incorporated. In other embodiments, fewer functional units may be used. In still other embodiments, the organization or order of the functional blocks may be different from that presented herein. It will be recognized by those of ordinary skill that ISP 110 may be implemented in specialized hardware (e.g., gate array technology) and/or by software. In one or more embodiments, one or more of the disclosed steps may be omitted, repeated, and/or performed in a different order than that described herein. Accordingly, the specific arrangement of steps or actions shown in Tables 1 and 2 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A black-level restoration method, comprising:
    obtaining a first color image of a scene, the first color image having a first plurality of pixels, each of the first plurality of pixels having a value wherein at least some of the first plurality of pixels have negative values;
    determining a pedestal value of the first color image;
    removing the pedestal value from at least some of the first plurality of pixel values to generate a second color image;
    clipping pixel values of the second color image to a specified value to generate a third color image;
    determining an offset value based on the second and third color images;
    adjusting the first color image's pixel values in accordance with the offset value to generate a fourth color image; and
    display the fourth color image on a display.

2. The method of claim 1, wherein the pedestal value comprises a statistical value indicative of an image capture device's dark-level noise.

3. The method of claim 1, wherein the specified value is zero (0).

4. The method of claim 1, wherein the second and third color images have a different resolution than the first color image.

5. The method of claim 1, wherein adjusting the first color image's pixel values comprises applying the offset value globally to the first color image's pixel values.

6. The method of claim 1, wherein adjusting the first color image's pixel values comprises interpolation.

7. The method of claim 1, further comprising:
    compressing the fourth color image to generate a fifth color image; and
    storing the fifth color image in a memory.

8. The method of claim 1, wherein the first color image undergoes image processing operations before the first color image's pixel values are adjusted by the offset value.

9. The method of claim 8, wherein at least one of the image processing operations comprises applying a gain to at least some of the first color image's pixel values.

10. An image capture system, comprising:
    one or more image sensors;
    memory operatively coupled to the one or more image sensors;
    a display operatively coupled to the memory; and
    one or more processors operatively coupled to the one or more image sensors, the memory and the display, the one or more processors configured to execute program code stored in the memory, the program code devised to cause the one or more processors to—
        obtain a first color image of a scene from at least one of the one or more image sensors, the first color image having a first plurality of pixels, each of the first plurality of pixels having a value wherein at least some of the first plurality of pixels have negative values,
        determine a pedestal value of the first color image,
        remove the pedestal value from at least some of the first plurality of pixel values to generate a second color image,
        clip pixel values of the second color image to a specified value to generate a third color image,
        determine an offset value based on the second and third color images, adjust the first color image's pixel values in accordance with the offset value to generate a fourth color image, and display the fourth color image on the display.

11. The image capture system of claim 10, wherein the pedestal value comprises a statistical value indicative of the image capture system's dark-level noise.

12. The image capture system of claim 10, wherein the specified value is zero (0).

13. The image capture system of claim 10, wherein the second and third color images have a different resolution than the first color image.

14. The image capture system of claim 10, wherein the first color image undergoes image processing operations before the first color image's pixel values are adjusted by the offset value.

15. The image capture system of claim 10, wherein the program code to cause the one or more processors to adjust the first color image's pixel values comprises program code to cause the one or more processors to apply the offset value globally to the first color image's pixel values.

16. A non-transitory storage device comprising instructions that when executed by one or more processors cause an image capture system to:

obtain a first color image of a scene from an image sensor, the first color image having a first plurality of pixels, each of the first plurality of pixels having a value wherein at least some of the first plurality of pixels have negative values;

determine a pedestal value of the first color image;

remove the pedestal value from at least some of the first plurality of pixel values to generate a second color image;

clip pixel values of the second color image to a specified value to generate a third color image;

determine an offset value based on the second and third color images;

adjust the first color image's pixel values in accordance with the offset value to generate a fourth color image; and display the fourth color image on a display.

17. The non-transitory storage device of claim 16, wherein the pedestal value comprises a statistical value indicative of the image capture system's dark-level noise.

18. The non-transitory storage device of claim 16, wherein the second and third color images have a different resolution than the first color image.

19. The non-transitory storage device of claim 16, wherein the first color image undergoes image processing operations before the first color image's pixel values are adjusted by the offset value.

20. The non-transitory storage device of claim 16, wherein the instructions to cause the one or more processors to adjust the first color image's pixel values comprise instructions to cause the one or more processors to apply the offset value globally to the first color image's pixel values.

* * * * *